United States Patent
Kobayashi (10) Patent No.: US 10,902,107 B2
(45) Date of Patent: Jan. 26, 2021

(54) INFORMATION PROCESSING SYSTEM, INFORMATION PROCESSING DEVICE, SERVER DEVICE, METHOD OF CONTROLLING INFORMATION PROCESSING SYSTEM, AND PROGRAM

(71) Applicant: CANON KABUSHIKI KAISHA, Tokyo (JP)

(72) Inventor: Makoto Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 393 days.

(21) Appl. No.: 16/038,766

(22) Filed: Jul. 18, 2018

(65) Prior Publication Data

US 2018/0322311 A1   Nov. 8, 2018

Related U.S. Application Data

(63) Continuation of application No. PCT/JP2017/001861, filed on Jan. 20, 2017.

(30) Foreign Application Priority Data

Feb. 18, 2016  (JP) ................. 2016-029189

(51) Int. Cl.
*H04L 29/06*  (2006.01)
*G06F 21/33*  (2013.01)
*G06F 21/62*  (2013.01)

(52) U.S. Cl.
CPC ........... *G06F 21/33* (2013.01); *G06F 21/62* (2013.01)

(58) Field of Classification Search
CPC ............... G06F 21/60; G06F 21/6245
See application file for complete search history.

(56) References Cited

U.S. PATENT DOCUMENTS 7,774,408 B2 * 8/2010 Sinha ............... G06Q 10/107
709/206
2003/0046549 A1   3/2003 Sakata
(Continued)

FOREIGN PATENT DOCUMENTS

JP  2002-261756 A  9/2002
JP  2003-076432 A  3/2003
(Continued)

*Primary Examiner* — Jason K Gee
(74) *Attorney, Agent, or Firm* — Venable LLP (57) ABSTRACT

An information processing system provides a web service to an information processing device having personal information from a server device providing the web service. The server device includes: an issuing unit that issues an access token in response to a request from the information processing device; an authentication unit that receives a service provision request from the information processing device and authenticates the access token; and a transmission unit that transmits a command for using the personal information to the information processing device when the access token is authenticated. The information processing device includes: a registration requesting unit that requests the server device to register the information processing device; a provision requesting unit that transmits the service provision request to the server device using the issued access token; and a utilization unit that uses the personal information in accordance with the command.

11 Claims, 7 Drawing Sheets

(56) References Cited

U.S. PATENT DOCUMENTS

| | | | | |
|---|---|---|---|---|
| 2004/0096043 A1* | 5/2004 | Timmins | ........... | H04M 3/53366 |
| | | | | 379/88.22 |
| 2006/0085344 A1* | 4/2006 | Grim, III | ............... | G06Q 20/40 |
| | | | | 705/51 |
| 2010/0100946 A1* | 4/2010 | Hallam-Baker | ........ | H04L 63/06 |
| | | | | 726/5 |
| 2015/0046712 A1* | 2/2015 | Korkishko | ............ | H04L 63/067 |
| | | | | 713/170 |

FOREIGN PATENT DOCUMENTS

| JP | 2005352634 A | 12/2005 |
|---|---|---|
| JP | 2006-072629 A | 3/2006 |

\* cited by examiner

INFORMATION PROCESSING SYSTEM, INFORMATION PROCESSING DEVICE, SERVER DEVICE, METHOD OF CONTROLLING INFORMATION PROCESSING SYSTEM, AND PROGRAM

CROSS-REFERENCE TO RELATED APPLICATIONS

This application is a Continuation of International Patent Application No. PCT/JP2017/001861, filed Jan. 20, 2017, which claim the benefit of Japanese Patent Application No. 2016-029189, filed Feb. 18, 2016. The contents of this application is hereby incorporated by reference herein in their entirety.

FIELD OF THE INVENTION

The present invention relates to an information processing system, an information processing device, a server device, a control method for an information processing system, and a program. Particularly, the invention relates to a method of protecting personal information when a REST service is called by an IoT device.

BACKGROUND ART

Recently, the Internet of Things (IoT) has attracted attention and with an increase in the number of IoT devices communicating with the Internet, opportunities for a server on a cloud providing a service to the IoT to use personal information have increased. Accordingly, prevention of leakage of personal information is important for a server on a cloud providing a service to the IoT. Therefore, Patent Literature 1 discloses a system in which data with high confidentiality need not be stored in a server on a data processing service side and in which high data security can be guaranteed.

CITATION LIST

Patent Literature

Patent Literature 1: Japanese Patent Laid-Open No. 2005-352634

A risk of leakage of personal information when a service is provided to the IoT is basically based on the accumulation of personal information on a server side providing the service to the IoT. For example, when personal information is used as the result of execution of a REST API, the personal information (such as a mail address and a user name) needs to be stored in the service side. That is, when a service side transmits a mail to a user as the result of execution of a REST API in the IoT device, it is necessary to register personal information in the service side. At this time, in order to register the personal information in the service side, the personal information has to be transmitted and received via a network.

In this case, storage of the personal information on the service side may cause a risk of leakage of information due to a malicious attack on the server or the like. However, when an IoT device has a mail transmitting function, the IoT device can transmit a mail on the basis of information stored therein in response to a request from the service side. In this case, the service side does not have to store the mail address. Examples of such a case of use include calling of a REST API by an IoT device not having a browser or a display or calling of a REST API accompanying periodic execution of operation by an IoT device (when an operator is not located in the vicinity of the device).

When it is desired to securely handle personal information in an IoT terminal which is located in a public place, for example, a certain authentication or verification is necessary at the time of access (addition, editing, referring to, and deletion) to personal information in a device located in an office or a public place. At this time, an external terminal refers to editable items and performs addition, editing, referring to, and deletion of editing items, but when it is intended to control editing items in accordance with cloud service policies, editing items cannot be controlled by authenticating only the device.

The invention has an objective to provide an information processing system in which personal information is not stored in a server (a server device) on a cloud providing a service to the IoT and personal information securely stored on an IoT device (an information processing device) side can be used.

SUMMARY OF THE INVENTION

In order to achieve the above-mentioned objective, according to the invention, there is provided an information processing system that provides a web service to an information processing device having personal information from a server device providing the web service, wherein the server device includes: a provision unit that provides the web service using the personal information which is managed by the information processing device; an issuing unit that issues an access token in response to a request from the information processing device; an authentication unit that receives a service provision request from the information processing device and authenticates the access token transmitted from the information processing device; and a transmission unit that transmits a command for using the personal information in accordance with providing the web service by the provision unit to the information processing apparatus when the access token is authenticated by the authentication unit, and wherein the information processing device includes: a management unit that manages the personal information; a registration requesting unit that requests the server device to register the information processing device; a provision requesting unit that transmits the service provision request to the server device using the access token issued by the issuing unit; and a processing unit that refers to the personal information which is managed by the management unit in accordance with the command transmitted from the transmission unit of the server device and performs a specific process using the personal information referred to in accordance with the command.

According to the invention, it is possible to provide an information processing system in which personal information is not stored in a server on a cloud providing a service to the IoT and personal information securely stored on an IoT device side can be used. Accordingly, personal information is not stored at all in a server on the cloud providing a service to the IoT and personal information securely stored in an IoT device side is used. Accordingly, it is possible to realize a REST API service that can provide the same functions as a conventional REST API service to a user.

Further features of the present invention will become apparent from the following description of exemplary embodiments with reference to the attached drawings.

DESCRIPTION OF THE EMBODIMENTS

Hereinafter, exemplary embodiments of the invention will be described with reference to the accompanying drawings or the like.

First Embodiment

In this embodiment, a service of registering an IoT device in a Web API server that provides a web service using a REST API over the Internet and notifying a user of the IoT device of the registration result using an electronic mail is assumed. A service of allowing a REST API server to use personal information in an IoT device along with processing results of a REST API and allowing a Web API server to edit personal information in a secure storage of an IoT device is assumed. The service that is provided by the Web API server according to this embodiment is not limited thereto, and can be applied to all Web API servers in which various services are installed.

In this embodiment, personal information is not stored on the Web API server side over the Internet in executing a REST API using a user's personal information as the result of execution of the REST API (a web service). Accordingly, it is possible to avoid leakage of personal information due to deficient information management on the server side, skimming when personal information flows between the Web API server and an IoT device, a Man-in-the-mIDle attack, or the like. Personal information in an IoT device is assumed to be satisfactorily protected by hardware having tamper-resistance such as a TPM. A REST API service using personal information in an IoT device is not limited to a registration result notification service of the IoT device. An OAuth structure may be used to transfer an authority in this embodiment. In OAuth, information called a token is used as information for verifying the authority transferred from the user.

[Case in which IoT Device Calls REST API Accompanying Transmission of a Mail]

Figure 1:
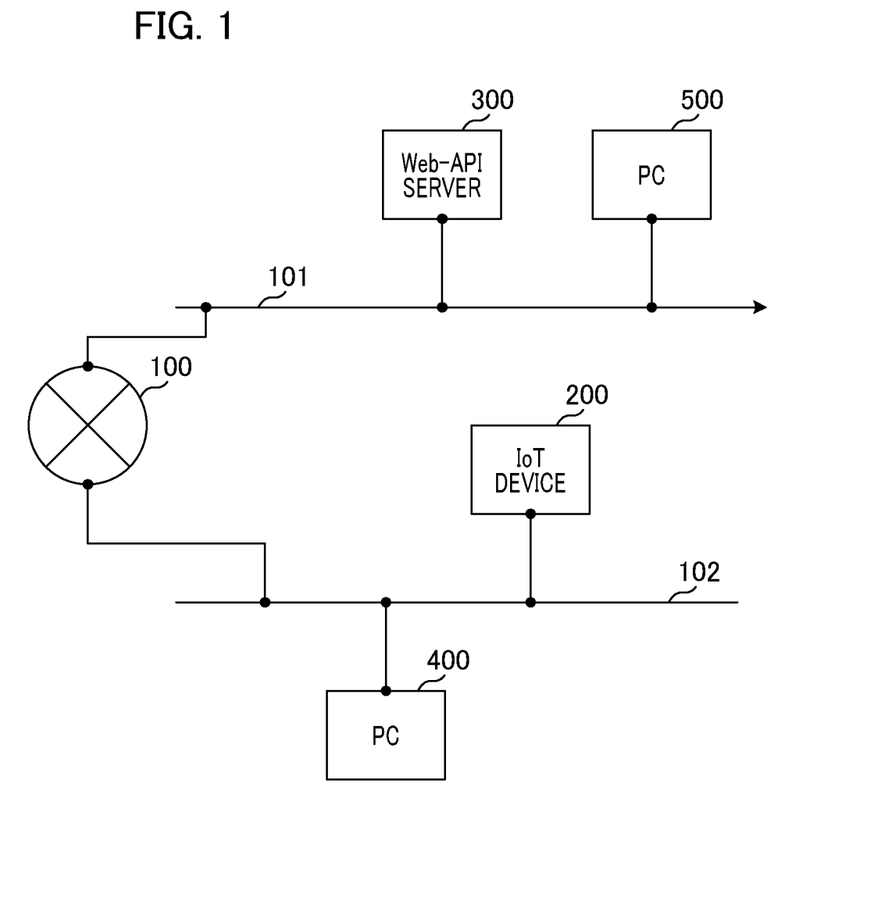
FIG. 1 is a diagram illustrating a system configuration according to an embodiment of the invention.

A REST API service system (an information processing system) according to this embodiment is realized over a network having a configuration illustrated in FIG. 1. The REST API service system includes a WAN 100, a LAN 101, a LAN 102, a client IoT device 200, a Web API server 300, an IoT device setting PC 400, and a Web API server setting PC 500. The WAN 100 is a wide area network, and a World Wide Web (WWW) system is constructed therein. The LAN 101 and the LAN 102 are local area networks that connect elements.

The client IoT device 200 is a device that is located in the LAN 101 and is an IoT device that is operated by a user or operates autonomously. The IoT device includes a Web browser or a dedicated client application for calling a Web API and a storage in which personal information is securely stored, and has functions such as operation of RSA encryption, creation of an RSA key pair (a public key and a private key), and SHA-1 hash calculation. There is a TPM (of which a specification is defined by the business group TCG (Trusted Computing Group)) chip that can perform encryption and decryption, creation and verification of a digital signature, and integrity verification of a platform in the chip. A user accesses the Web API server 300 using a web browser or a dedicated application and uses a Web API additionally using personal information in a secure storage. The IoT device setting PC 400 is a PC which is located in the LAN 101 similarly to the client IoT device 200 and performs setting of personal information in the client IoT device 200 or an editing request thereof The Web API server (server device) 300 is a server which is located in the LAN 102 and provides various services in response to a Web API request (a service provision request) from the client IoT device 200. For example, various services include a printing service and a documentation service. The Web API server setting PC 500 is a PC which is located in the LAN 102 similarly to the Web API server 300 and sets parameters associated with the personal information in the Web API server 300.

The client IoT device 200 and the Web API server 300 are connected via the WAN 100, the LAN 101, and the LAN 102. The client IoT device 200 and the services thereof may be constructed over individual LANs or may be constructed over the same LAN. They may be constructed in the same PC.

Figure 2:
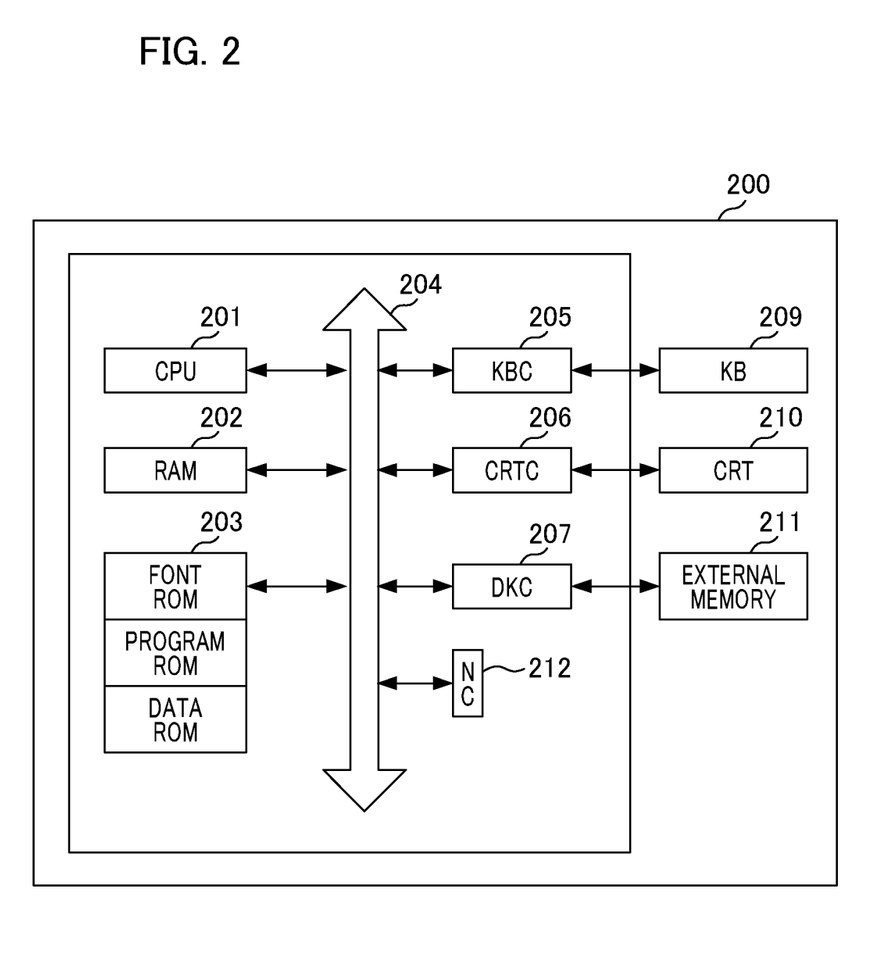
FIG. 2 is a diagram illustrating a hardware configuration of devices.

FIG. 2 is a block diagram illustrating a hardware configuration of the client IoT device 200 according to this embodiment. A server computer of the Web API server 300, the IoT device setting PC 400, and the Web API server setting PC 500 have the same configuration as illustrated in the drawing. The hardware block diagram illustrated in FIG. 2 corresponds to a hardware block diagram of a general information processing device, and the hardware configuration of a general information processing device can be applied to the client IoT device 200 according to this embodiment and the server computer.

In FIG. 2, a CPU 201 executes a program such as an OS or an application which is stored in a program ROM in a ROM 203 or loaded into a RAM 202 from an external memory 211. Here, an OS is an abbreviation of an operating system that operates in a computer, and the operating system is hereinafter referred to as an OS. The processes of flowcharts which will be described later can be embodied by executing the program. The RAM 202 serves as a main memory or a work area of the CPU 201. In this embodiment, the ROM 203 includes a font ROM, a program ROM, and a data ROM, but is not limited thereto and may include a single ROM or may include individual ROMS by functions. A keyboard controller (KBC) 205 controls a key input from a keyboard (KB) 209 or a pointing device which is not illustrated. A CRT controller (CRTC) 206 controls display on a CRT display 210. A disk controller (DKC) 207 controls an data access in a hard disk (HD) that stores various data or an external memory 211 such as a Floppy (registered trademark) disk (FD). An NC 212 is connected to a network and performs a communication control process with respect to another device connected to the network. In the following description, an entity of execution on hardware is the CPU 201 and an entity of software is an application program which is installed in the external memory 211, unless mentioned otherwise. The elements are connected to each other via a bus 204 in a communicative manner.

Figure 3A:
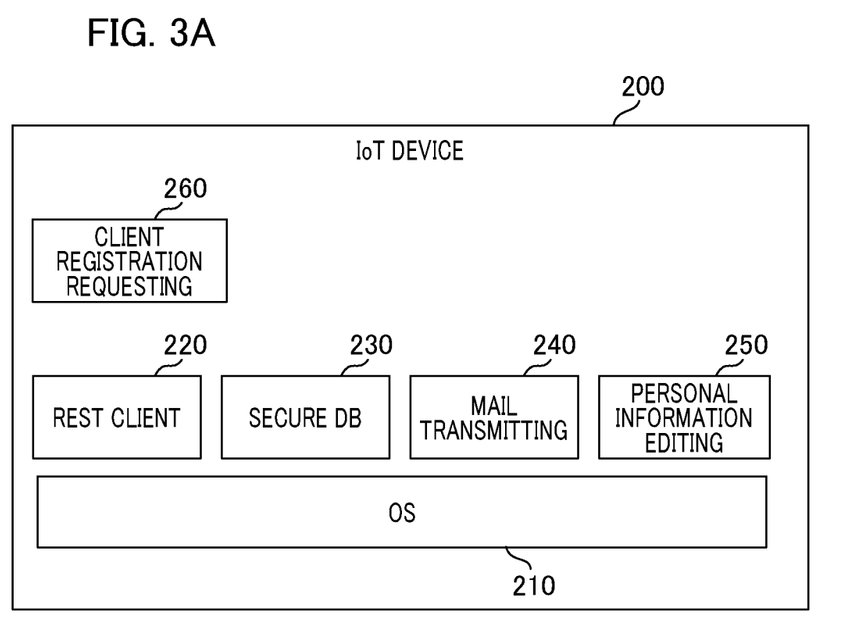
FIGS. 3A and 3B are diagrams illustrating a module configuration of the devices.
Figure 3B:
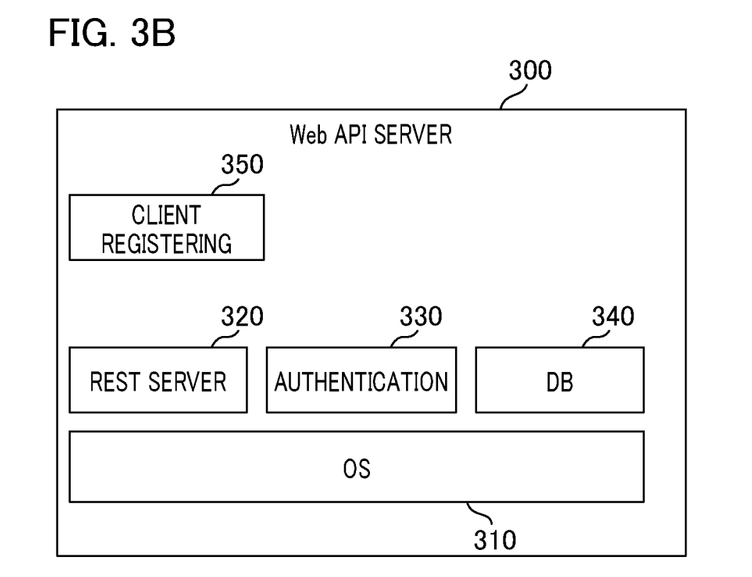

FIGS. 3A and 3B are diagrams illustrating module configurations of the client IoT device 200 and the Web API server 300 according to this embodiment. The client IoT device 200 controls various applications by causing the CPU 201 to execute the OS stored in the ROM 203 or the external memory 211. As the OS 210, a real-time OS is generally used, but a general-purpose OS such as Linux (registered trademark) has come to be used recently. The client IoT device 200 includes a REST client module 220 which is a user agent for using the WWW. The client IoT device 200 includes a secure DB module 230 therein. The secure DB module 230 includes a TPM chip of which the standard specification is defined by the business group TCG (Trusted Computing Group) and a personal information database which is encrypted using encryption key information stored in the TPM chip.

The TPM chip is an LSI chip that is installed in the IoT device 230 and in which processing functions associated with security are installed. The processing functions associated with security specifically include functions of encoding and decoding an RSA encryption or the like, a function of creating a key pair of a public key and a private key, a function of calculating a hash value such as SHA1, and functions of creating and verifying a digital signature. The processing functions associated with security also include functions of storing and managing generated values in a nonvolatile memory built therein. The TPM chip has tamper-resistance and also has a function of disabling reading of the chip by physically destroying the chip when it is intended to read information through analysis of the inside. The secure DB module 230 can store personal information which will be described later using an encryption key in the TPM chip.

The IoT device 200 includes a client registration request module 260 that registers the IoT device in the Web API server 300 which will be described later using a client registration sequence which will be described later. A mail transmitting module 240 is a module that functions using personal information such as a mail address which is stored in the secure DB module 230 of the IoT device 200 as the processing result of a device status information transmission request REST API. The mail transmitting module 240 has an SMTP client function that uses an SMTP as an electronic mail transmission protocol, and it is assumed that a destination SMTP server is set in advance. A user can appropriately change settings of an SMTP server serving as a destination. A personal information editing module 250 is a module that processes personal information stored in the secure DB module 230 of the IoT device 200 as the processing result of a personal information editing request REST API.

In this embodiment, the IoT device 200 includes the mail transmitting module 240 and the personal information editing module 250 which are two modules coping with a Web API server. However, as described above, the modules included in the IoT device 200 for coping with various Web APIs are not limited thereto.

The Web API server 300 controls applications by causing the CPU 201 to execute the OS stored in the ROM 203 or the external memory 211. The OS 310 may be generally a general-purpose OS such as Linux (registered trademark). The Web API server 300 includes a REST server module 320. The REST server module 320 has functions of receiving a REST request from the REST client module 220 of the IoT device 200, processing the request, and then returning a REST response in the format of JSON which will be described later. The Web API server 300 includes an authentication module 330 that performs management and verification of an authentication token and a DB module 340 that manages and stores device registration data and token data. A client registering module 350 of the Web API server 300 receives a request from the client registration request module 260 of the IoT device 200. Then, the client registering module 350 has a client registering function of registering IoT device information such as a device ID of the IoT device in the DB module 340 of the Web API server 300.

[Registration of Device]

Figure 4:
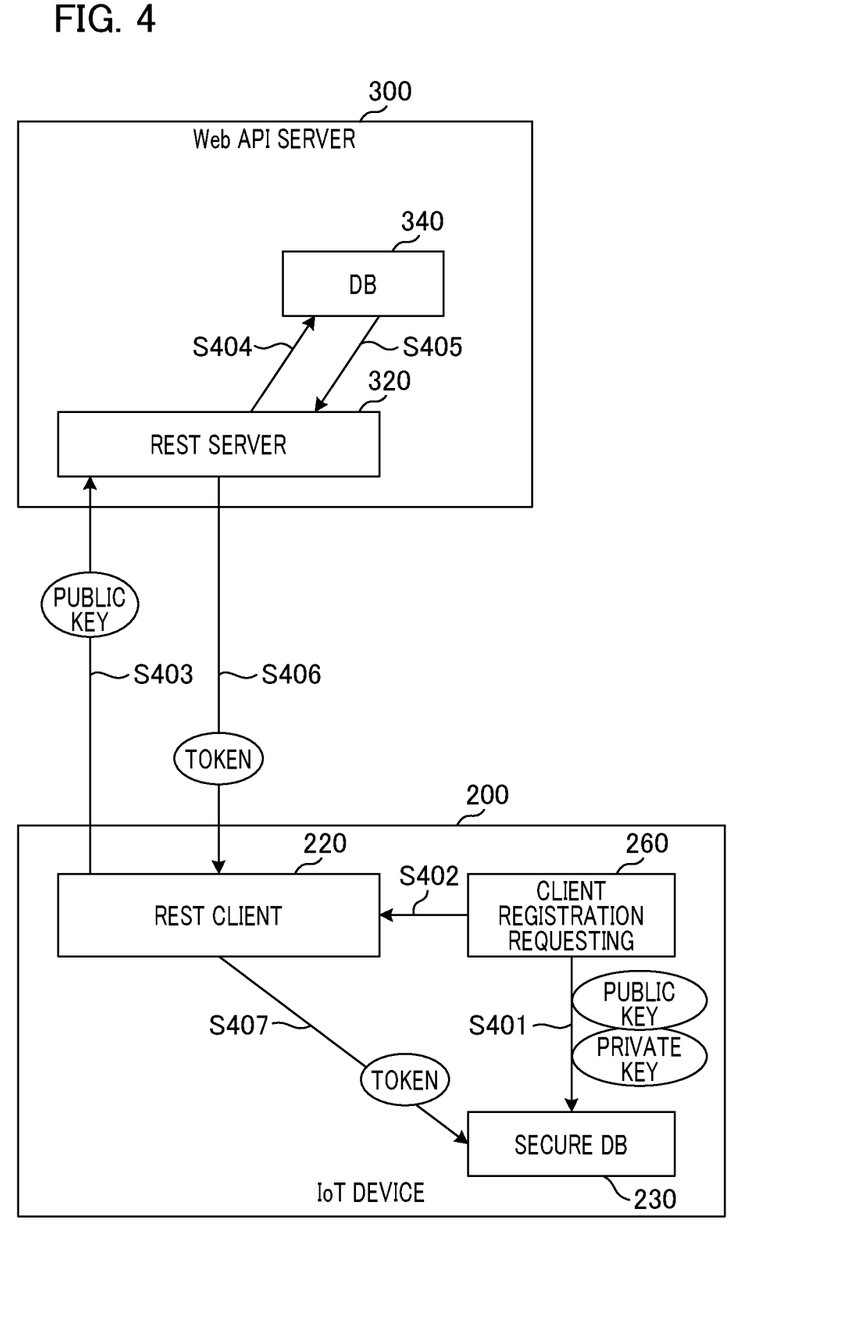
FIG. 4 is a diagram illustrating a sequence of registering an IoT device in a Web API server.

FIG. 4 is a diagram illustrating a sequence of registering the client IoT device 200 in the Web API server 300. This sequence is started when the client registration request module 260 of the IoT device 200 transmits a client registration request. In this embodiment, a URL of a REST end point of the Web API server 300 is stored in the REST client module 220 of the IoT device 200. However, without being limited thereto, the URL may be stored in the secure DB module 230 in the IoT device 200, the external memory 211, or the like, or may be input from the outside when it can be externally input. A device-relevant information table which is present in the secure DB module 230 of the IoT device 200 will be described now with reference to Table 1.

TABLE 1

| DeviceID | TenantID | Public_Key | Private_Key | Token |
|---|---|---|---|---|
| Device_A | 101AA | xxxxx | yyyyy | zzzzz |

Table 1 is a device-relevant information table and includes fields of DeviceID, TenantID, Public_Key, Private_Key, and Token. DeviceID stores a predetermined device ID at the time of factory shipment of the IoT device 200. TenantID stores a tenant to which a preset device belongs. Public_Key and Private_Key store a public key and a private key of 2048 bit RSA which are created by the IoT device 200 and which will be described later. Token stores an access token which is acquired from the Web API server 300 and which will be described later. TenantID may be input from the outside of the IoT device 200.

The client registration request module 260 creates a public key and a private key of 2048 bit RSA using the TPM chip in order for the Web API server 300 to authenticate the IoT device 200. The generated public key and the generated private key are stored as a public key and a private key in the device-relevant information table (Table 1) of the secure DB module 230 (Step S401). The key lengths of the keys and the algorithm may be other than 2048 bit/RSA as long as safety thereof is satisfactorily verified.

The client registration request module 260 designates the device ID (Device_A), the tenant ID (101 AA), and the public key (xxxxx) in the device-relevant information table (Table 1) of the secure DB module 230 as arguments. The REST client module 220 is used to call a device registration REST API of the Web API server 300 (Step S402). The REST client module 220 which is requested to call the REST API by the client registration request module 260 designates arguments and calls a client registration API of the Web API server 300 (Step S403).

In the Web API server 300 of which the client registration API is called by the IoT device 200, the REST server module 320 receives the client registration API. The REST API in this embodiment is expressed as a message in the format of JSON using the HTTP or HTTPS protocol. A specific client registration API will be described below.

[Client Registration API]

```
POST /client_registration HTTP/1. 1
Host: restapiserver.example.com
Content-Type: application/json;charset=UTF-8
{
"device_id":"Device_A",
"tenant_id":"101AA",
"public_key":"MIIBIjANBgkqhkiG9w0BAQEFAAOCAQ8AMIIBCgKCAQEAq3Daj
woRjpfF+aHtzygzNIvKEqw8HfUd1eGcLzJi4cCJITlY64IlNQXzDEev5FyylMIQT0xA
NBBcE1lF/rzRSf9JzE4KAjInz7UmKxedRBSYdiix/jeB1TcJ9e3KHHIOnwGxJLw1X1
op3Lbl5sYPvNOp7OAqvk+ZueZocCzoZ+7VIb/vCt5I+jm8Tim8tPtDyBSPSwVTCVU
VzWBnx2e4TXjHMfB6mU4eoZ4HRRvaGofeBc7sIIEf1zGRuds7kGgdpZBWEYD5lJ
31TM5y9aIhEOPtuxRn6X0IVqJpwOWUTMlFX6WhNZ0SECkrXAvUkq8mooyCk+jc
LRT+DPt9DvmXAwIDAQAB"
}
```

The REST server module 320 of the Web API server 300 having received the client registration API stores the arguments of the client registration API in a device registration table (Table 2) (Step S404). That is, the device ID and the tenant ID which are the arguments and the public key created by the IoT device 200 are stored in the device registration table (Table 2) of the DB module 340 that manages and stores device registration data and token data. The device registration table stored in the DB module 340 of the Web API server 300 will be described below with reference to Table 2.

TABLE 2

| TenantID | DeviceID | Public_Key | Token | nonce |
|---|---|---|---|---|
| 101AA | Device_A | xxxxx | zzzzz | nnnnn |
| 102AA | Device_B | xxxxx | zzzzz | nnnnn |

The device registration table (Table 2) includes TenantID, DeviceID, Public_Key, Token, and nonce. TenantID stores a tenant to which a preset device belongs. DeviceID stores a device ID that is designated by the argument of the client registration API and indicates a registered client. Public-Key stores a public key that is similarly designated by the argument of the client registration API and created by the registered client. Token stores a token that is issued at the time of device registration which will be described later. Nonce stores a nonce value that is used for a structure for guaranteeing that a response to a personal information access request of the IoT device 200 as a client which will be described later is rightful. TenantID may be input from the outside of the Web API server 300.

The REST server module 320 of the Web API server 300 checks whether the tenant ID ("101 AA") which is an argument of the received REST API is present in the device registration table (Table 2). When the tenant ID is present, REST server module 320 stores the device ID ("Device_A") which is similarly an argument of the REST API in a DeviceID storage area of the same column (Step S404). When the device ID registration has succeeded, the REST server module 320 issues an access token which is used to verify whether subsequent service call by the IoT device 200 having called the client registration API is rightful. Then, the REST server module 320 stores the issued access token in a Token area of the same column as TenantID and DeviceID of the request source in the device registration table (Table 2) (Step S404).

When storage of the device ID and the public key in the device registration table (Table 2) and issuing and storage of the access token end normally, the REST server module 320 is notified of normal ending (Step S405). The REST server module 320 returns the access token as a REST API response to the IoT device 200 which is a call source of the client registration API (Step S406). At this time, the access token is returned as a REST API response in the format of JSON using the HTTP or HTTPS protocol. Specific contents of the client registration REST API response will be described below.

[Client Registration REST API Response]

```
HTTP/1.1 200 OK
Content-Type: application/json;charset=UTF-8
Cache-Control: no-store
Pragma: no-cache
{
"token":"5d9556d8-5035-4a67-abd3-13bd13c7cdf0@1000000AAxI"
}
```

The REST client module 220 having received the client registration API response from the Web API server 300 stores the token which is an argument of the client registration API response in Token of the device-relevant information table (Table 1) (Step S407). That is, the token ("5d9556d8-5035-4a67-abd3-13bd13c7cdf0@1000000AAxI") is stored in the Token storage area of the device-relevant information table (Table 1) in the secure DB module 230.

[REST API Process Accompanying Mail Transmission]

Figure 5:
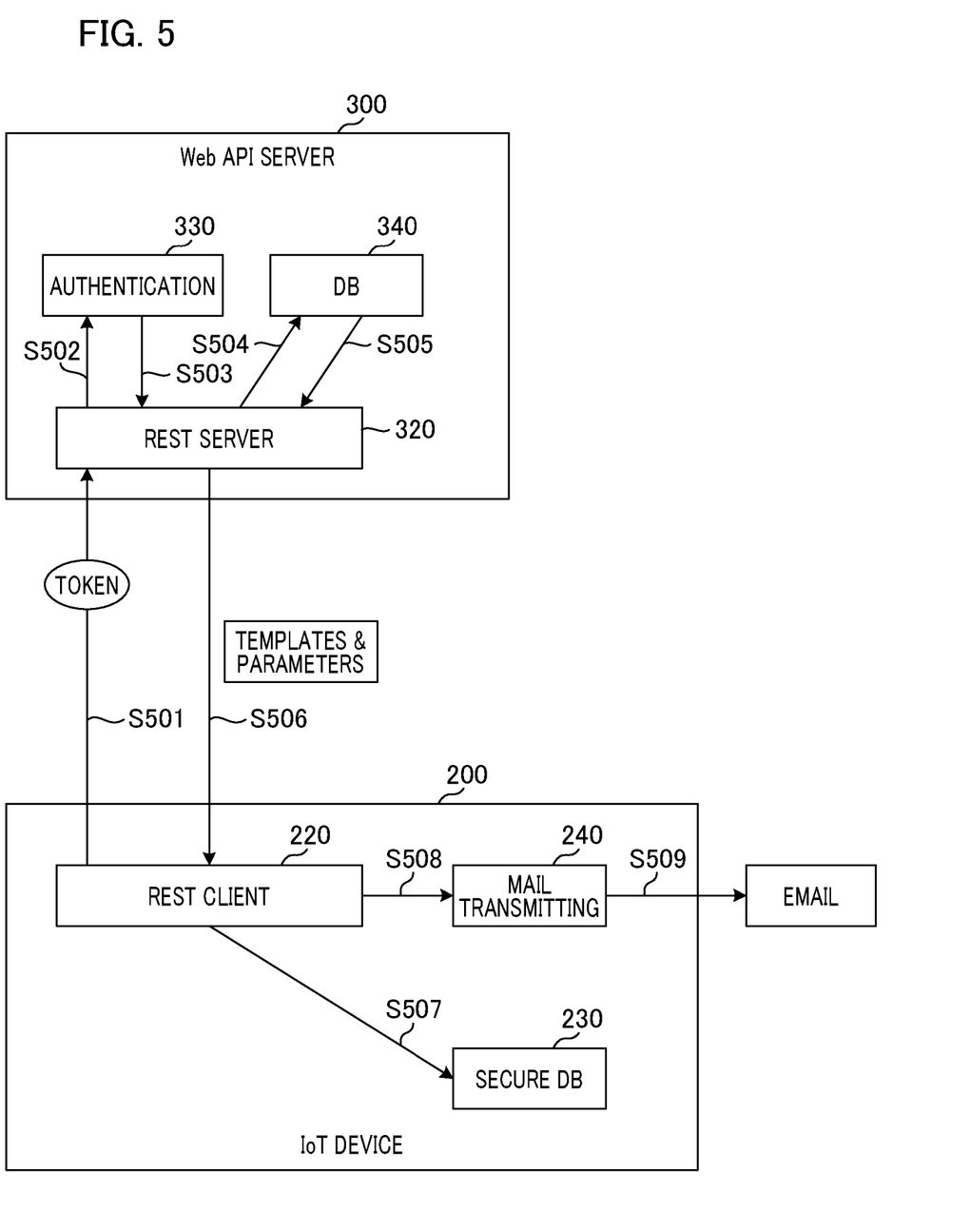
FIG. 5 is a diagram illustrating a sequence of a mail transmitting process of an IoT device.

FIG. 5 is a diagram illustrating a sequence of a mail transmitting process of the IoT device 200 as a specific process using personal information. This sequence is started when a user presses a mail transmission button of the IoT device 200 for starting communication with the Web API server 300 after the device registering process ends and then the REST client module 220 of the IoT device 200 calls the REST API of the REST server module 320 of the Web API server 300.

In this embodiment, a URL of a REST end point of the Web API server 300 is stored in the REST client module 220 of the IoT device 200. However, the URL may be stored in the secure DB module 230 of the IoT device 200 or the external memory 211 or may be input from the outside when it can be externally input.

The REST client module 220 of the IoT device 200 that performs transmission of a mail calls a mail transmission REST API which is installed in the REST server module 320 using the device-relevant information table (Table 1) (Step S501). That is, the REST client module 220 calls the mail transmission REST API using DeviceID and TenantID in the device-relevant information table (Table 1) in the secure DB module 230 and the access token acquired in the device registration as arguments. A specific mail transmission REST API will be described below.

[Mail Transmission REST API]

```
POST/client_status HTTP/1.1
Host:restapiserver.example.com
Content-Type:application/json;charset=UTF-8
{
"device_id":"Device_A",
"tenant_id":"101AA",
"token":"5d9556d8-5035-4a67-abd3-13bd13c7cdf0@1000000AAxI"
}
```

The REST server module 320 of the Web API server 300 having received the mail transmission REST API verifies the REST API call by the IoT device using the authentication module 330 that performs management and verification of an authentication token. That is, the REST server module 320 sends device_id, tenant_id, and token of the received REST API call to the authentication module 330 that performs management and verification of an authentication token (Step S502). In this embodiment, device_id is "Device_A," and tenant_id is "101 AA." The token is "5d9556d8-5035-4a67-abd3-13bd13c7cdf0@1000000AAxI." The authentication module 330 compares the values of the sent device_id, tenant_id, and token with DeviceID, TenantID, and Token which have been registered in the device registration table (Table 2) through the device registering process. Then, the authentication module 330 determines whether the call is a REST API call from the registered IoT device (Step S503). When the determination result is negative, an error is returned in response to the REST API call.

When an access token verifying process in a verification module is normal (Step S503), the REST server module 320 acquires a client status and acquires a mail content template and parameters for transmission of a mail. A REST API response command table and a REST API response command parameter table in the Web API server 300 will be described below with reference to Tables 3 and 4.

TABLE 3

| TenantID | ServiceID     | Command   |
|----------|---------------|-----------|
| 101AA    | client_status | send-mail |
| 101AA    | edit_user     | edit_user |

The REST API response command parameter table (Table 4) includes the following columns. That is, the REST API response command parameter table includes Command corresponding to Command in Table 3 and arguments indicating parameters of Command corresponding to the following commands. The REST API response command parameter table also includes Auth1 and Auth2 indicating what personal information of the IoT device is used for Commands which are executed by the IoT device 200. The REST API response command parameter table also includes Privilege1 and Privilege2 indicating access authorities to personal information in the IoT device which are expressed by Auth1 and Auth2. In this embodiment, there are a plurality of Auths and Privileges depending on the commands as described above, and column names thereof are number-added column names such as Auth1, Auth2, . . . , Privilege1, Privilege-2, . . . . These column names are present in the REST API parameter table (Table 4).

TenantID, ServiceID, Command, Arguments, Auth1, Auth2, Privilege1, and Privilege2 in Tables 3 and 4 may be input from the outside of the Web API server 300. Values stored in Auth1 and Auth2 in Table 4 are values of personal information parameters which are present in the IoT device 200 and which will be described later. Privilege1 and Privilege2 in Table 4 store one of four character strings "C," "R," "U," and "D" indicating access authorities or a combination thereof. In this embodiment, regarding the character strings, "C" indicates a creation authority, "R" indicates a reading authority, "U" indicates an update authority, and "D" indicates a deletion authority.

The REST server module 320 of the Web API server 300 refers to the REST API response command table (Table 3) and the REST API response command parameter table (Table 4) in the DB module 340 (Step S504). Then, the REST server module 320 acquires a service which is designated by the mail transmission REST API call and Command in the REST API response command table (Table 3) corresponding to the tenant ID designated by a parameter of the mail transmission REST API. That is, the REST server module 320 acquires the service (client_status) designated in the mail transmission REST API call and Command corresponding to the tenant ID ("tenant_ID":"101 AA") designated by a parameter of the mail transmission REST API. In addition, the REST server module 320 acquires the columns of Arguments, Auth1, Auth2, Privilege1, and Privilege2

TABLE 4

| Command   | Arguments    | Auth1                      | Privilege1 | Auth2               | Privilege2 |
|-----------|--------------|----------------------------|------------|---------------------|------------|
| send-mail | Template_A   | private_admin_mail_address | R          | private_admin_name  | R          |
| edit_user | Edit_Param_B | private_user1              | CRUD       | none                | none       |

The REST API parameter table (Table 3) includes the following columns. That is, the REST API response command table includes TenantID storing a tenant to which a present device belongs and SeviceID which is uniquely determined by REST APIs installed in the REST server module 320 of the Web API server 300. The REST API response command table also includes Command indicating a command which corresponds to the REST API of ServiceID and belongs to a response of the REST API and which is executed by the IoT device 200. These columns are present in the REST API response command table (Table 3).

corresponding to Command in the corresponding REST API response command parameter table (Table 4) (Step S505). In this embodiment, "send-mail" is referred to for Command, "Template_A" is referred to for Arguments, and "private_admin_mail_address" is referred to for Auth1. "R" is referred to for Privilege1, "private_admin_name" is referred to for Auth2, and "R" is referred to for Privilege2. Here, "Template_A" of Arguments indicates a mail content template for mail transmission which is present in the external memory 211 of the Web API server 300. A specific "Template_A" in this embodiment will be described below.

[Template_A]

---

To: ##${Auth1}##
Cc:
Subject: Device Status Information
Hello, ##${Auth2}##
This is a Status Information & Change Notification.
https://restservice.example.com/device/status

---

The REST server module 320 creates a response (a command) using Command, Argument, Auth1, Privilege1, Auth2, and Privilege2. That is, the REST server module 320 creates a response (a command) of the mail transmission REST API and returns the created response to the IoT device 200 (Step S506). Specifically, "send-mail" is used as Command, "Template_A" is used as Argument, and "private_admin_mail_address" is used as Auth1. "R" is used as Privilege1, "private_admin_name" is used as Auth2, and "R" is used as Privilege2. In this embodiment, ##${Auth1}## of Template_A is developed in "private_admin_mail_address" of Auth1, and the part of ##${Auth2}## is developed in "private_admin_name" of Auth2. "R" of Privilege1 is developed in a value of "private_info": "private_admin_mail_address" in the format of JSON. It is also developed in a value of "access_privilege": {"create":"NG", "read":"OK", "update":"NG", "delete":"NG" }. "R" of Privilege2 is developed in a value of "private_info":"private_admin_name" in the format of JSON. It is also developed in a value of "access_privilege": {"create":"NG", "read":"OK", "update":"NG", "delete":"NG" }. A specific response of the mail transmission REST API according to this embodiment will be described below in the format of JSON.

[Response of Mail Transmission REST API]

---

```
{
"type":
"Program",
"body":[
    {
        "command": "send-email",
        "arguments": {
            "to": "##private_admin_mail_address##",
            "cc": "",
            "subject": "Status Information",
            "body": "Hello, ##private_admin_user_name##¥r¥nThis
is a Status Information & Change
Notification.¥r¥nhttps://restservice.example.com/device/status"
        },
        "auth":[
            {
                "private_info": "private_admin_mail_address",
                "access_privillage": {
                    "create": "NG",
                    "read": "OK",
                    "update": "NG",
                    "delete": "NG"
                }
            },
            {
                "private_info": "private_admin_user_name",
                "access_privillage":{
                    "create": "NG",
                    "read": "OK",
                    "update": "NG",
                    "delete": "NG"
                }
            }
        ]
    }
]
}
```

---

The REST client module 220 of the IoT device 200 having called the mail transmission REST API installed in the REST server module 320 of the Web API server 300 receives the JSON message as a response of the REST API. Then, the REST client module 220 operates based on the values of "command," "argument," "auth" in the message with reference to the JSON message of the received REST API response.

In this embodiment, the REST API client (the IoT device 200) performing a REST API call operates in accordance with a command included in a response (a command) from the Web API server (the Web API server 300). The REST API client accesses personal information stored therein and executes the command based on a personal information access authority included in the response from the Web API server 300. At this time, personal information of the REST client is not present on the Web API server side.

In this embodiment, the REST client module 220 refers to the JSON message of the received REST API response. Then, the REST client module 220 extracts "private_admin_mail_address" of "private_info" of "auth" and "private_admin_name" of "private_info." The REST client module 220 refers to Personal information table 1 described in Table 5 which is stored in the secure DB module 230 of the IoT device 200.

TABLE 5

| private_info | mail_address | name | nickname |
| --- | --- | --- | --- |
| private_admin | admin@iot.example.com | Administrator | Admin |
| private_user1 | User1@iot.example.com | User1 | User1 |

Personal information table 1 (Table 5) includes the following columns. That is, the columns include private_info indicating a personal information item, mail_address indicating mail address, name indicating a name, and nickname indicating a nickname. In Personal information table 1 (Table 5) in this embodiment, a mail address, a name, and a nickname are present as elements of personal information. The elements of personal information which is managed by the secure DB module 230 of the IoT device 200 depending on types of REST APIs may include an address, position information, and an affiliation name.

In this embodiment, the REST client module 220 refers to Personal information table 1 (Table 5) in the secure DB module 230 and the JSON message of the received REST API response. Then, the IoT device 200 acquires personal information which has been requested as a parameter in the JSON message by the REST server module of the Web API server 300 from Personal information table 1 (Table 5). Specifically, the corresponding value "admin@IoT.example.com" in Personal information table 1 (Table 5) is acquired as "private_admin_mail_address" of "private_info" of"auth" in the JSON message. Similarly, the corresponding value "Administrator" in Personal information table 1 (Table 5) is acquired as "private_admin_name" of "private_info" in the JSON message. At this time, the REST client module 220 of the IoT device 200 has a limited access authority corresponding to "access_privilege" of "private_info" in the JSON message received from the Web API server 300.

In this embodiment, "private_admin_mail_address" of "private_info" and "access_privilege" of "private_admin_ name" in the JSON message is "read":"OK." Accordingly, the REST client module 220 accesses and reads information of "private_admin_mail_address" and "private_admin_ name" in Personal information table 1 (Table 5) (Step S507).

Thereafter, the REST client module 220 replaces a personal information part of a mail content template which is present in "arguments" of the JSON message using items acquired from Personal information table 1 (Table 5) in the secure DB module 230. That is, personal information is set at a predetermined position of the mail template. Specifically, personal information parts in the item "private_admin_mai_address" ("admin@iot.example.com") and the item "private_admin_name" ("Administrator") are replaced. "admin@iot.example.com" in the personal information is set as the item "private_admin_mail_address" (a destination). "Administrator" is used as the item "private_admin_name." The mail content template becomes the following mail content message.
[Mail Content Message]
To: admin@iot.example.com
Cc:
Subject: Device Status Information
Hello, Administrator
This is a Status Information & Change Notification.
https://restservice.example.com/device/status The REST client module 220 calls the mail transmitting module 240 on the basis of the created mail content message and the value of "command" ("send-mail") in the JSON message of the received REST API response (Step S508). The mail transmitting module 240 of the IoT device 200 transmits an electronic mail on the basis of the received mail content message (Step S509).

As a result, it is possible to provide an information processing system in which personal information is not stored in a server (a server device) on the cloud providing a service to the IoT and personal information securely stored on the IoT device (an information processing device) side can be used.

Second Embodiment

[Case in which IoT Device Performs REST API Call Accompanying Personal Information Editing]

Figure 7:
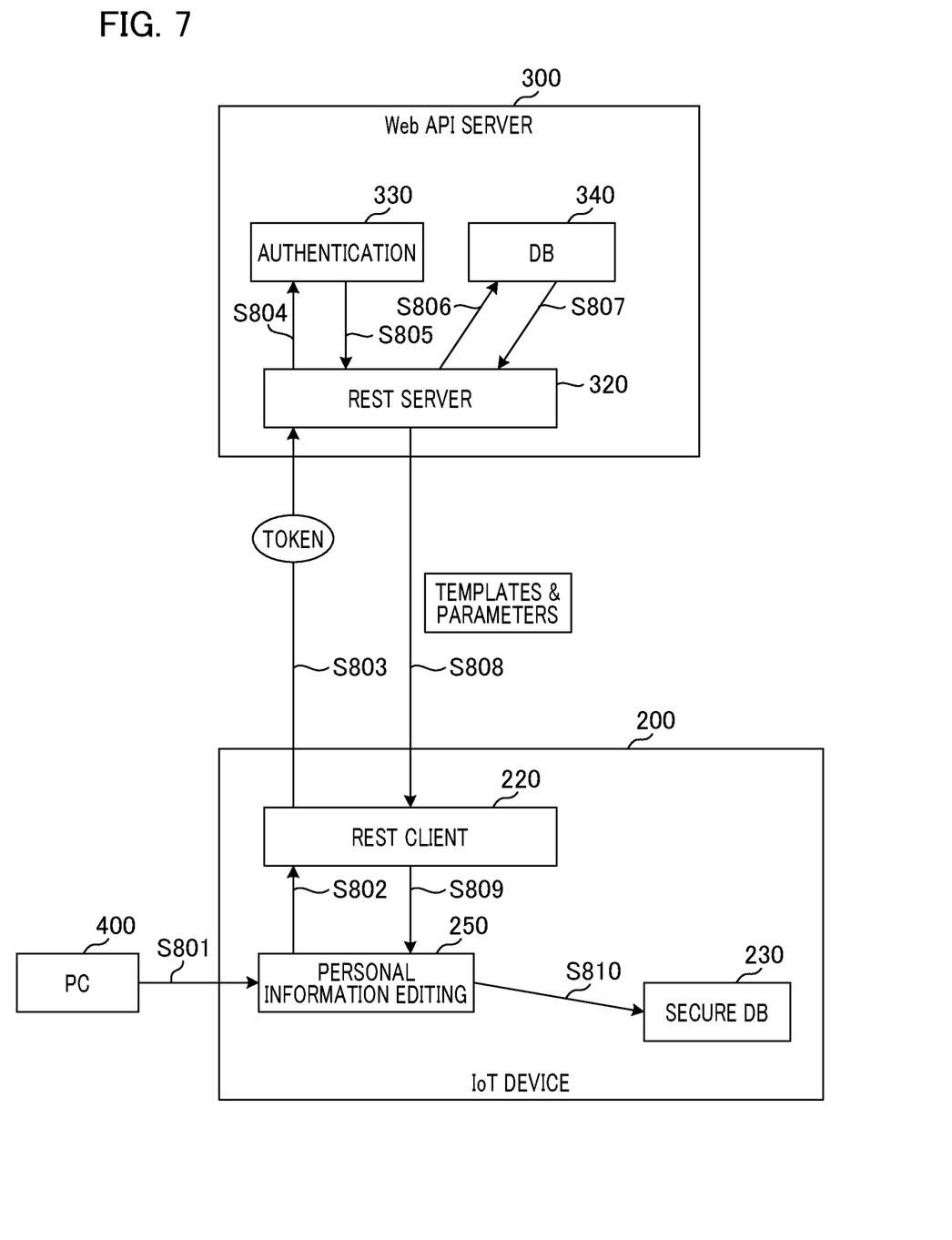
FIG. 7 is a diagram illustrating a sequence of a personal information editing process in an IoT device.

In this embodiment, a case in which the IoT device 200 performs a REST API call accompanying editing of personal information in the secure DB module 230 with the same configuration as in the first embodiment will be described. FIG. 7 is a diagram illustrating a sequence of a personal information editing process in the IoT device 200 as a specific process using personal information according to this embodiment. This sequence is started when the PC 400 presses a personal information editing button which is used for the PC 400 to start communication with the IoT device 200 after the device registering process ends and then requests the personal information editing module 250 to edit personal information (Step S801). Requesting for editing personal information is specifically performed using the following personal information editing request message.
[Personal Information Editing Request Message]

```
{
    "type": "Program",
    "body": [
        {
            "command": "edit-user",
            "arguments": {
                "private_info": "private_user1",
                "name": "User2",
                "nickname": "User2"
            }
        }
    ]
}
```

The message is a message for updating "name" and "nickname" of "private_user1" in Personal information table 1 (Table 5) in the secure DB module 230 of the IoT device 200. The personal information editing module 250 of the IoT device 200 having received the message requests the REST client module 220 of the IoT device 200 to call a personal information editing permission check REST API (Step S802). In this embodiment, it is assumed that personal information in Personal information table 1 (Table 5) in the secure DB module 230 is edited by the PC 400 or the like in the same LAN 102 as the IoT device 200. In this case, the REST API call is performed on the Web API server 300 and personal information is edited as the result. Accordingly, for example, when the IoT device 200 is located in a public place and is used by a plurality of users, it is possible to forcibly apply a personal information editing policies of the Web API server 300 side to editing of personal information in the IoT device 200.

The REST client module 220 which has been requested to call the personal information editing permission check REST API by the personal information editing module 250 calls a REST API using the access token acquired in the device registration as an argument (Step S803). Specifically, the REST client module 220 calls a REST API of the REST server module 320 using the access token stored in Token in device-relevant information table (Table 1) in the secure DB module 230 as an argument. In the REST API, the REST client module creates parameters from a personal information editing request message.

In this embodiment, a URL of an REST end point of the Web API server 300 is stored in the REST client module 220 of the IoT device 200. However, the URL may be stored in the secure DB module 230 in the IoT device 200, the external memory 211, or the like, or may be input from the outside when it can be externally input. A specific personal information editing permission check REST API will be described below.
[Personal Information Editing Permission Check REST API]

```
POST/edit_private_info HTTP/1.1
Host: restapiserver.example.com
Content-Type: application/json;charset=UTF-8
{
    {
        "command": "edit-user",
        "arguments": {
            "private_info": "private_user1",
            "arguments": "name", "nickname"
        }
    },
    "device_ID":"Device_A",
    "tenant_ID":"101AA",
    "token":"5d9556d8-5035-4a67-abd3-13bd13c7cdf0@1000000AAxI"
}
```

The parameters of the personal information editing permission check REST API are created from the personal information editing request message by the REST client module. "edit-user" of "command" in the personal information editing request message is a parameter of "command" in the personal information editing permission check REST API. Editing target information of "arguments" in the personal information editing request message is a parameter of "private_info":"private_user1" in the personal information editing permission check REST API. That is, "private_info": "private_user1" indicating editing target information of "arguments" is a parameter of "private_info":"private_user1." An editing target information item of arguments" in the personal information editing request message and editing details are parameters other than editing details because it is inquired whether the editing target information items can be edited in the personal information editing permission check REST API. Specifically, "name":"User2"

and "nickname":"User2" indicating the editing target information item of "arguments" and editing details thereof are parameters of "name" and "nickname" other than the editing details. "device_ID" is DeviceID which is stored in Device_ID in device-relevant information table (Table 1) in the secure DB module 230. "tenant_ID" is TenantID stored in Tenant_ID, and "token" is an access token acquired in the device registration and stored in Token.

The REST server module 320 of the Web API server 300 having received the personal information editing permission check REST API verifies the REST API call of the IoT device using the authentication module 330 that performs management and verification of an authentication token. The Web API server module sends device_ID, tenant_ID, and token of the received REST API call to the authentication module 330 that performs management and verification of an authentication token (Step S804). Specifically, "Device_A" as device_ID, "101 AA" as tenant_ID, and "5d9556-d8-5035-4a67-abd3-13bd13c7cdf0@1000000AAxI" as token are sent to the authentication module 330. The authentication module 330 compares the values of the sent values with the values in the device registration table (Table 2) in the Web API server 300 and determines whether the call is a REST API call from the registered IoT device (Step S805). That is, DeviceID, TenantID, and Token in the device registration table (Table 2) are compared with the sent values of device_ID, tenant_ID, and token. When the determination result is negative, an error is returned in response to the REST API call.

designated in the personal information editing permission check REST API call and Command (edit-user) in the REST API response command table (Table 3). Specifically, the REST server module 320 acquires Command (edit-user) in Table 3 corresponding to the tenant ID ("tenant_ID": "101 AA") designated by a parameter of the personal information editing permission check REST API. The REST server module 320 acquires the values of Arguments, Private_info1, Private_info2, Privilege1, and Privilege2 corresponding to Command in REST API response command parameter table (Table 6). That is, the REST server module 320 acquires the values corresponding to Command (edit-user) in REST API response command parameter table (Table 6) (Step S807). In this embodiment, depending on the parameters designated in the personal information editing permission check REST API, "edit-user" is referred to for Command, "private_user1" is referred to for Arguments, and "name" is referred to for Private_info1. "CRU" is referred to for Privilege1, "nickname" is referred to for Private_info2, and "CRUD" is referred to for Privilege2.

The REST server module 320 creates a response of the personal information editing permission check REST API using Command, Arguments, Private_info1, Privilege1, Private_info2, and Privilege2, and returns the response to the IoT device 200. That is, Command ("edit-user"), Arguments ("private_user1"), and Private_info1 ("name") are used. Privillege1 ("CRU"), Private_info2 ("nickname"), and

TABLE 6

| Command | Arguments | Private_info1 | Privilege1 | Private_info2 | Privilege2 |
| --- | --- | --- | --- | --- | --- |
| edit_user | private_admin | name | R | nickname | RUD |
| edit_user | private_user1 | name | CRU | nickname | CRUD |

REST API response command parameter table 2 (Table 6) includes the following columns. That is, REST API response command parameter table 2 includes Command corresponding to Command in Table 3 and Arguments indicating editing targets of personal information in the secure DB module 230 of the IoT device 200 in this embodiment as parameters of Commands corresponding to Commands. REST API response command parameter table 2 also includes Privilege1 and Privilege2 indicating access authorities to personal information as the editing target in the IoT device which are indicated as information items of the editing target of personal information in the secure DB module 230. In this embodiment, the information items of the editing target of personal information are Private_info1, Private_info2, Private_info1, and Private_info2. As described above, a plurality of pieces of Private_info and Privilege are present depending on the command, and column names thereof are number-added column names such as Private_info1, Private_info2, . . . , Privilege1, Privilege-2, . . . . These columns are present in REST API response command parameter table 2 (Table 6). TenantID, ServiceID, Command, Arguments, Private_info1, Private_info2, Privilege1, and Privilege2 in Tables 3 and 6 may be input from the outside.

When the access token verifying process of the verification module is normal (that is, when the access token can be authenticated) (Step S805), a response is returned to the REST server module 320. Then, the REST server module 320 refers to the REST API response command table (Table 3) and REST API response command parameter table 2 (Table 6) in the DB module 340 (Step S806). Then, the REST server module 320 acquires a service (edit-user)

Privillege2 ("CRUD") are also used. In this embodiment, Command ("edit-user") us developed in "command": "edit-user." Arguments ("private_user1") is developed in "private_ID": "#private_user1#" of "arguments."

A part surrounded with "#" in "#private_user1#" explicitly indicates that it is personal information in the IoT device 200. Private_info1 ("name") is developed in "param1": "#name#" of "arguments". Private_info2 ("nickname") is developed in "param2": "#nickname#" of "arguments". Privilege1 indicating an access authority is developed in "access_privillege": {"create": "OK", "read": "OK", "update": "OK", "delete": "NG" }. Privilege2 is developed in "access_privillege": {"create": "OK", "read": "OK", "update": "OK", "delete": "OK" }. As described above, the values of Arguments, Private_info1, Privilege1, Private_info2, and Privilege2 are developed in values in the format of JSON. A specific response of the personal information editing permission check REST API in this embodiment will be described below in the format of JSON.

[Response of Personal Information Editing Permission Check REST API]

```
{
  "type": "Program",
  "body": [
    {
      "command": "edit-user",
      "arguments": {
        "private_ID": "#private_user1#",
        "param1": "#name#",
        "access_privillege": {
          "create": "OK",
```

```
            "read": "OK",
            "update": "OK",
            "delete": "NG"
          },
          "private_ID": "#private_user1#",
          "param2": "#nickname#",
          "access_privillege": {
            "create": "OK",
            "read": "OK",
            "update": "OK",
            "delete": "OK"
          }
        }
      }
    ]
}
```

The REST client module 220 of the IoT device 200 having called the mail transmission REST API installed in the REST server module 320 receives the JSON message as a response of the REST API (Step S808). Then, the REST client module 220 operates based on the values of "command" and "arguments" in the message with reference to the JSON message of the received REST API response.

In this embodiment, the REST API client (the IoT device 200) performing a REST API call operates in accordance with a command included in a response from the Web API server (the Web API server 300). The REST API client accesses personal information stored therein and executes the command based on a personal information access authority included in the response from the Web API server. At this time, personal information of the REST client is not present on the Web API server side.

In this embodiment, the REST client module 220 refers to the JSON message of the received REST API response and edits personal information designated in "command": "edit-user." That is, the REST client module 220 extracts "private_ID", "param1", "access_privillege", "param2", and "access_privillege" of "arguments" in the received response of the personal information editing permission check REST API. The extracted data is sent to the personal information editing module 250 (Step S809). The personal information editing module 250 refers to Personal information table (Table 5) in the secure DB module 230. The personal information editing module 250 compares the response of the personal information editing permission check REST API received from the REST client module 220 with the personal information editing request message and verifies details of the personal information editing request message.

That is, the personal information editing request message indicates a request message for changing "name" and "nickname" of "private_user1" of "private_info" in Table 5 in the secure DB module 230. That is, the personal information editing request message indicates a request message for changing "name" and "nickname" to "User2" and "User2." In the response of the personal information editing permission check REST API received from the REST client module 220, "name" can be created, updated, and changed in the values of "private_info" in "private_ID." That is, "name" in the value "private_user1" of "private_info" can be created, updated, and changed. Similarly, "nickname" thereof can be created, updated, changed, and deleted. Therefore, the personal information editing module 250 changes "name" and "nickname" of "private_user1" of "private_info" in Table 5 on the basis of the personal information editing request message (Step S810). That is, "name" and "nickname" of "private_user1" are changed to "User2" and "User2."

[Means for Making Access to Personal Information Securer]

Figure 6:
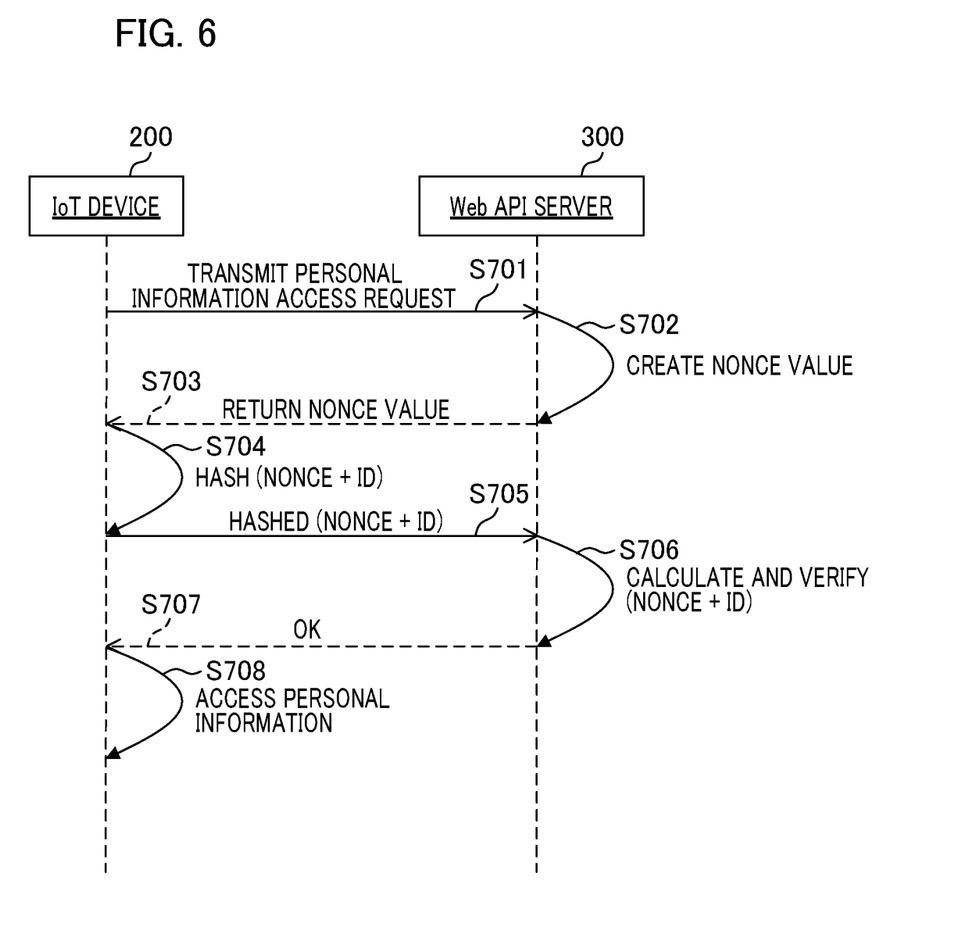
FIG. 6 is a diagram illustrating a sequence of processing a personal information access request.

Means for making an access to personal information securer will be described below. FIG. 6 is a sequence diagram illustrating means for making surer that a request source of a REST API at the time of an access to personal information in the secure DB module 230 of the IoT device 200 is the IoT device 200 and a request destination is the Web API server 300. The sequence illustrated in FIG. 6 is performed in Step S501 in the first embodiment and Step S803 in the second embodiment.

First, the IoT device 200 transmits a personal information access request to the Web API server 300 (Step S701) before transmitting a REST API request accompanying an access to personal information. This request is performed using an access token acquired in the device registration as an argument. The Web API server 300 having received the personal information access request creates a nonce value which is a temporary random value for the acquired access token. Then, the created nonce value is stored as a nonce value character string in a nonce area of the same column as the token in the device registration table (Table 2) in the DB module 340 (Step S702). Specifically, "7f5d949c-0318-4e4c-84f1-4d569d674ab5" is created as the nonce value character string with a UUID. The created nonce value character string is returned to the IoT device 200 (Step S703).

The IoT device 200 having received the nonce value character string as a response from the Web API server 300 acquires a DeviceID character string in the device-relevant information table (Table 1). Then, the IoT device 200 combines the acquired DeviceID character string with the nonce value character string to calculate Hash value 1 using an SHA1 hash algorithm (Step S704). Specifically, in this embodiment, the nonce value characteristic (7f5d949c-0318-4e4c-84f1-4d569d674ab5) and the DeviceID character string ("Device_A"). A value which is obtained by hashing the value obtained by the combination corresponds to Hash value 1. The IoT device 200 transmits Hash value 1 to the Web API server (Step S705).

The Web API server 300 having received Hash value 1 acquires the DeviceID character string and the nonce value character string of the same column as the token in the device registration table (Table 2) in the DB module 340. The DeviceID character string and the nonce value character string are combined to calculate Hash value 2 using the SHA1 hash algorithm. Specifically, in this embodiment, the nonce value character string ("7f5d949c-0318-4e4c-84f1-4d569d674ab5") and the DeviceID character string ("Device_A") are combined. Hash value 1 and Hash value 2 are compared to perform hash value comparison. When the hash values are the same as the comparison result, a response of OK of the personal information access request is transmitted (Step S707). Then, an access to personal information is carried out (Step S708). When the hash values are not the same as the comparison result, a response of error is transmitted in response to the personal information access request.

According to this embodiment, in execution of a REST API of using a user's personal information as the result of execution of the REST API, since the personal information is not stored on the server side, it is possible to solve the problems with deficient management of information on the server side, leakage of information, and the like. Since personal information does not leak to the network, it is possible to cope with a Man-in-the-mIDle attack or the like. Personal information on the client device side is satisfactorily protected (by the TPM or the like). The cloud side performs processes not associated with personal information of users and the device side performs processes associated with personal information of users. By overlaying these two ways to process a REST API, it is possible to provide a service in which server-side information is matched with personal information without accumulating personal information in the server side.

Other Embodiments

The invention can also be embodied by a process of supplying a program for realizing one or more functions in the above-mentioned embodiments to a system or a device via a network or a storage medium and causing one or more processors of a computer in the system or the device to read and execute the program. The invention can also be embodied by a circuit that realizing one or more functions (for example, an ASIC).

While exemplary embodiments of the invention have been described above, the invention is not limited to the embodiments and can be modified and altered in various forms without departing from the gist thereof.

What is claimed is:

1. An information processing system that provides a web service to an information processing device having personal information from a server device providing the web service, wherein the server device includes:
   a least one processor and at least one memory storing executable instructions that, when executed by the at least one processor, causes the server device to function as:
      a provision unit that provides the web service using the personal information which is managed by the information processing device;
      an issuing unit that issues an access token in response to a request from the information processing device;
      a generation unit that generates and transmits a nonce value in response to a request for access to the personal information stored in the information processing device, and generates a hash value from the nonce value and an ID of a registered information processing device;
      a verification unit that performs error processing if a hash value generated and transmitted by the information processing device does not match the hash value generated by the generation unit, and permits access to the personal information stored in the information processing device if the hash value generated and transmitted by the information processing device matches the hash value generated by the generation unit;
      an authentication unit that receives a service provision request from the information processing device and authenticates the access token transmitted from the information processing device; and
      a transmission unit that transmits a command for using the personal information in accordance with providing the web service by the provision unit to the information processing device when the access token is authenticated by the authentication unit, and
   wherein the information processing device includes:
      a least one processor and at least one memory storing executable instructions that, when executed by the at least one processor, causes the information processing device to function as:

a management unit that manages the personal information;
   a registration requesting unit that requests the server device to register the information processing device;
   a requesting unit that requests the server device to access the personal information stored in the information processing device, receives the nonce value in response to the request, generates a hash value from the nonce value and a device ID of the information processing device, and requests a verification to the server device;
   a provision requesting unit that transmits the service provision request to the server device using the access token issued by the issuing unit in response to receiving a response permitting the access to the personal information stored in the information processing device; and
   a processing unit that refers to the personal information which is managed by the management unit in accordance with the command transmitted from the transmission unit of the server device and performs a specific process using the personal information referred to in accordance with the command.

2. The information processing system according to claim 1, wherein the transmission unit transmits the command to the information processing device when the authentication unit determines that the access token from the provision requesting unit is the access token issued by the issuing unit.

3. The information processing system according to claim 1, wherein the authentication unit transmits an error to the information processing device when the authentication unit determines that the access token from the provision requesting unit is not an access token issued by the issuing unit, and the processing unit does not perform the specific process using the personal information when the error is transmitted by the authentication unit.

4. The information processing system according to claim 1, wherein the command transmitted by the transmission unit includes a command for a mail transmitting process, and the processing unit sets the referred-to personal information at a predetermined position in a mail template included in the command, creates an electronic mail, and transmits the created electronic mail.

5. The information processing system according to claim 1, wherein the processing unit sets a mail address in the referred-to personal information as a destination of a mail template included in the command, creates an electronic mail, and transmits the created electronic mail.

6. The information processing system according to claim 1, wherein the command transmitted by the transmission unit includes a command for a personal information editing process, and the processing unit edits the personal information managed by the management unit.

7. The information processing system according to claim 6, wherein the processing unit performs creation, updating, or changing of the personal information managed by the management unit in accordance with the command for the personal information editing process.

8. The information processing system according to claim 1, wherein the command includes an access authority for using the personal information, and the utilization unit uses the personal information in accordance with an authority which is designated by the access authority.

9. The information processing system according to claim 8, wherein the access authority includes at least one of an authority to create personal information, an authority to read personal information, an authority to update personal information, and an authority to delete personal information.

10. An information processing device having personal information, which is provided with a web service from a server device, the information processing device comprising:
a least one processor and at least one memory storing executable instructions that, when executed by the at least one processor, causes the information processing device to function as:
a management unit that manages the personal information;
a registration requesting unit that requests the server device to register the information processing device;
a requesting unit that requests the server device to access the personal information stored in the information processing device, receives a nonce value in response to the request, generates a hash value from the nonce value and a device ID of the information processing device, and requests a verification to the server device;
a provision requesting unit that transmits a service provision request to the server device using an access token which is issued by the server device in response to the registration request by the registration requesting unit, in response to receiving a response from the server device permitting access to the personal information stored in the information processing device when the hash value generated and transmitted by the information processing device matches a hash value generated by the server device; and
a processing unit that refers to the personal information which is managed by the management unit in accordance with a command for using the personal information transmitted from the server device in accordance with providing the web service when the access token is authenticated by the server device in response to the service provision request from the information processing device, and performs a specific process using the personal information referred to in accordance with the command.

11. A non-transitory computer readable medium storing a program for causing a computer to as function as an information processing device which is provided with a web service from a server device, the program comprising code to execute:
managing, by a management unit, personal information;
requesting, by a registration requesting unit, the server device to register the information processing device;
by a requesting unit, requesting the server device to access the personal information stored in the information processing device, receiving a nonce value in response to the request, generating a hash value from the nonce value and a device ID of the information processing device, and requesting a verification to the server device;
by a provision requesting unit, transmitting a service provision request to the server device using an access token which is issued by the server device in response to the registration request by the registration requesting unit, in response to receiving a response from the server device permitting access to the personal information stored in the information processing device when the hash value generated and transmitted by the information processing device matches a hash value generated by the server device; and
by a processing unit, referring to the personal information which is managed by the management unit in accordance with a command for using the personal information transmitted from the server device in accordance with providing the web service when the access token is authenticated by the server device in response to the service provision request from the information processing device, and performing a specific process using the personal information referred to in accordance with the command.

\* \* \* \* \*